April 14, 1942.  I. C. McKECHNIE  2,279,999
POWER TRANSMISSION
Filed Nov. 14, 1940  4 Sheets-Sheet 1
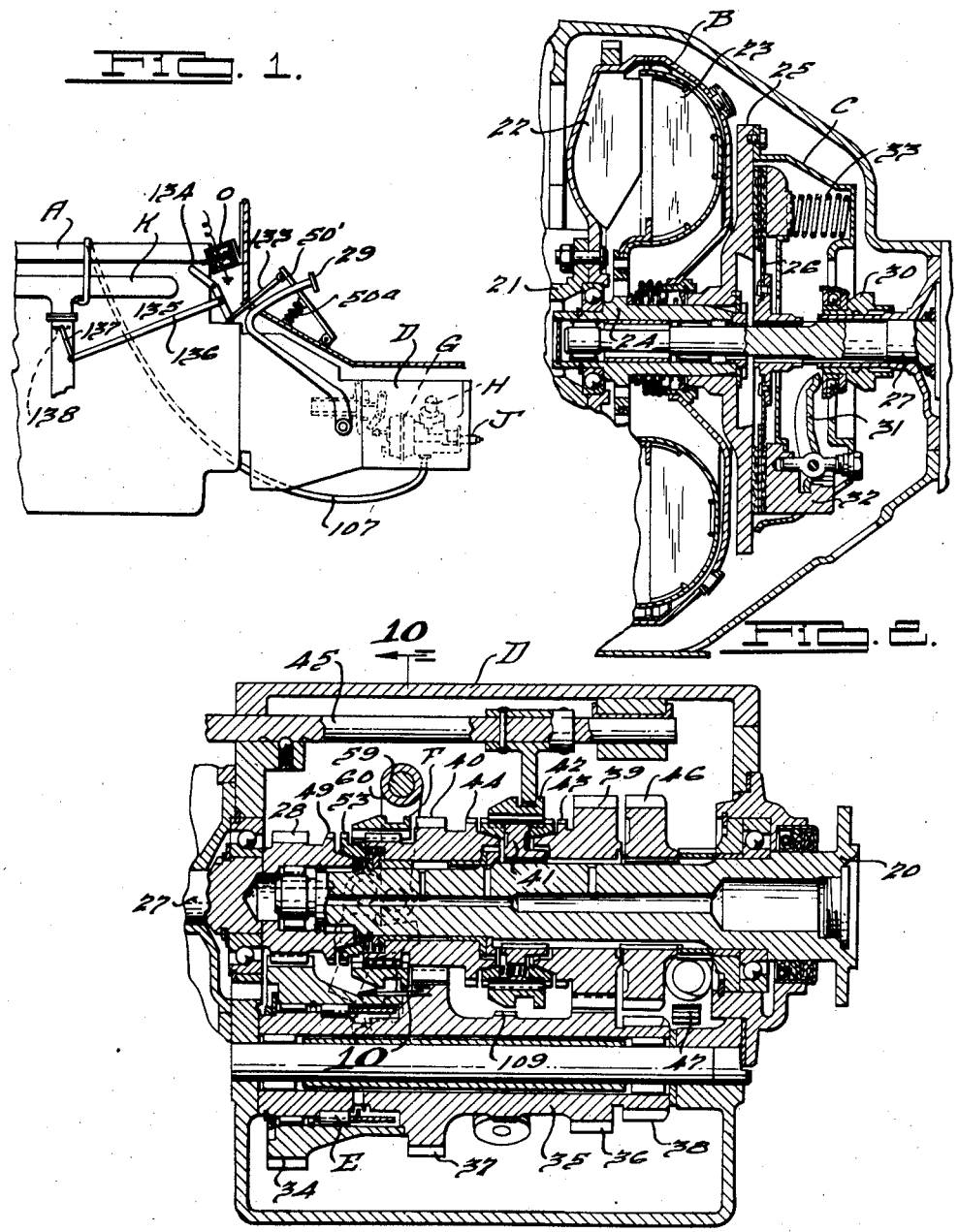

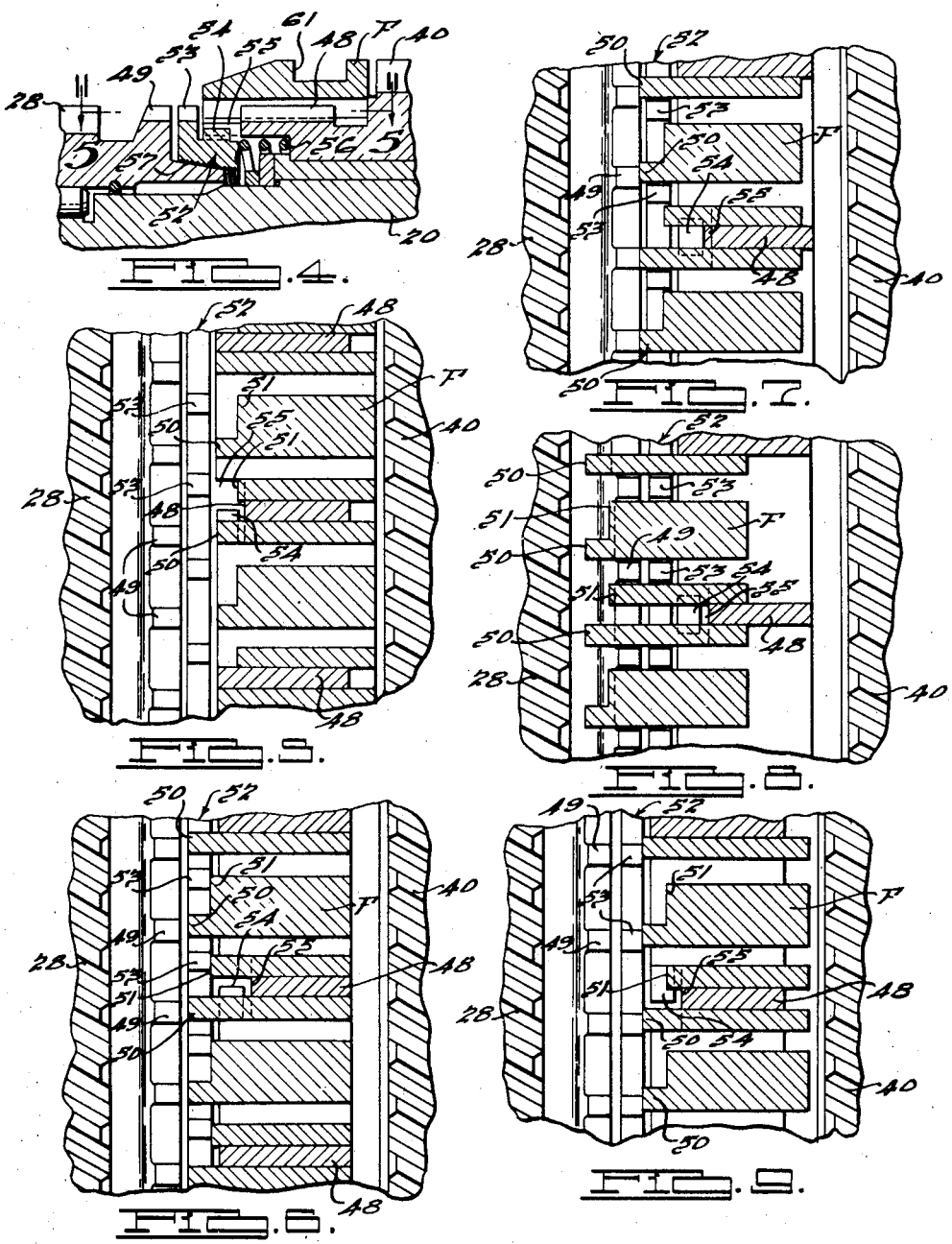

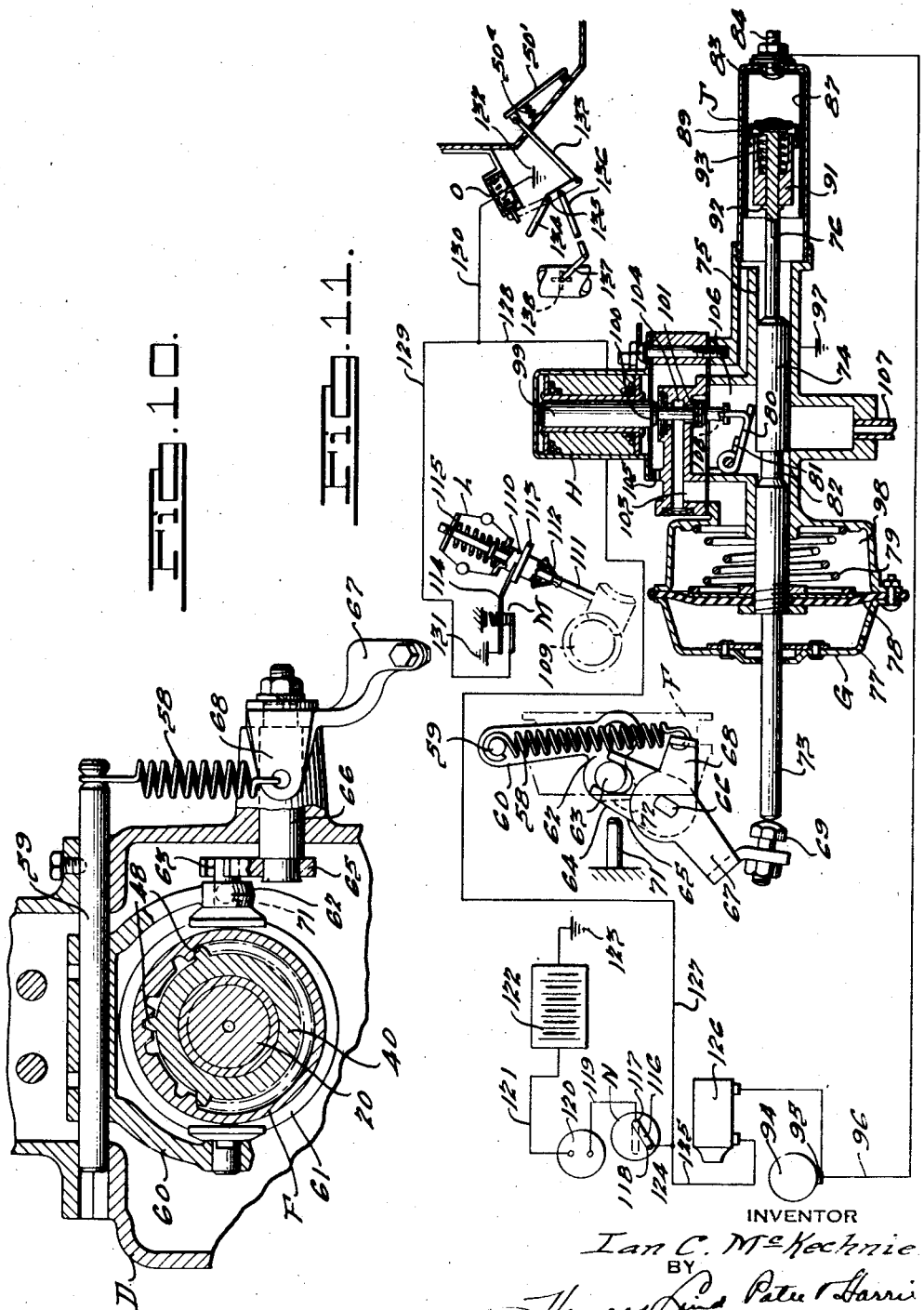

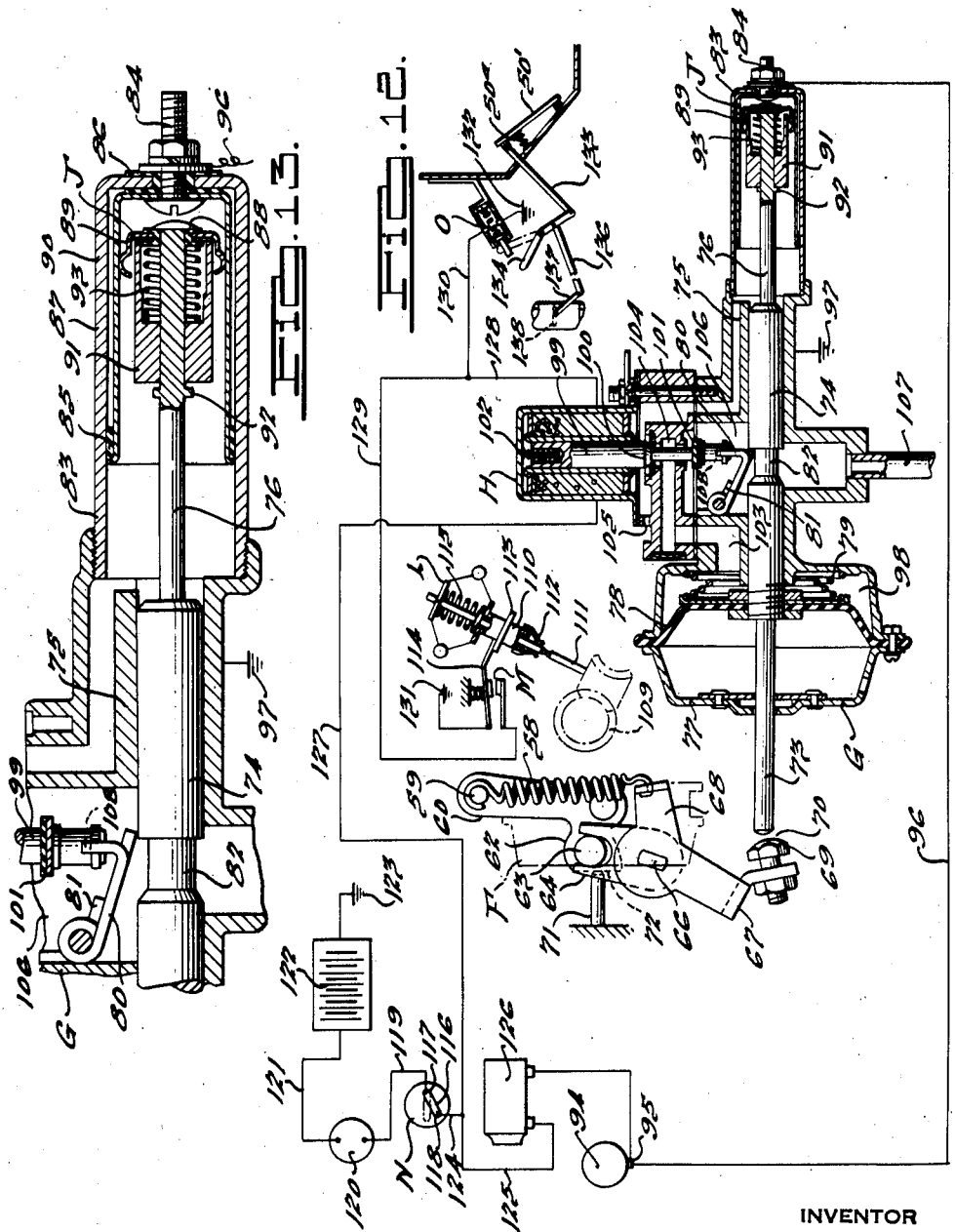

UNITED STATES PATENT OFFICE 2,279,999

POWER TRANSMISSION

Ian C. McKechnie, Detroit, Mich., assignor to Chrysler Corporation, Highland Park, Mich., a corporation of Delaware Application November 14, 1940, Serial No. 365,568

15 Claims. (Cl. 74—472)

This invention relates to motor vehicles and refers more particularly to power transmission and control mechanism therefor.

My invention has particular reference to transmission systems in which the torque load is relieved as by momentary interruption of the engine ignition or by other suitable means in order to unload positively engageable drive control elements so as to facilitate disengagement of such elements. One example of such a transmission is described and claimed in the copending application of Carl A. Neracher et al., Serial No. 335,310, filed May 15, 1940.

In such transmission systems, the engine ignition when interrupted accommodates disengaging movement of the movable or shiftable drive control element but it sometimes happens that the interrupting mechanism functions to restore the ignition and hence the torque load at the drive control elements before disengagement thereof has been effected. This results in failure of the transmission to function properly. It is, of course, desirable to interrupt the ignition for as brief an interval of time as is necessary and because of many factors it is difficult to arrive at a time interval for setting the ignition interrupting mechanism so that it will function the same under all conditions. Among these factors are variation in oil viscosity, variation in clearance between the drive control elements and the fit of the parts in general, requirements for disengagement of the drive control elements incident to kick-down and bringing the car to a stop, and other factors all of which give rise to the aforesaid failure. Furthermore, it is not always so much the time of torque interruption that is of greatest importance in effecting the disengagement. Of greater significance in many instances is the effect of torque interruption itself because it is during the change in the condition of torque load that it is possible to disengage the movable drive control element. Thus, if the load is a drive load then the interruption either relieves this load sufficiently to allow movement of the movable element or is of such duration as to change the drive load to a coast load thereby also accommodating the disengagement during the interval of this change. If the initial load is a coast load then the same effect is obtained by either relieving this load or reversing it to a drive load during torque interruption. If the interruption occurs for an indefinitely long period of time and the movable element fails to disengage, prolongation of the time of interruption is of no avail because the torque load quickly reverses and it is as a practical matter just as difficult to disengage the element under either drive or coast load.

Another difficulty experienced with transmission systems of the aforesaid character is in connection with failure of the ignition interrupting means to restore the ignition to normal operation after it has functioned to interrupt the ignition. This occurs especially in those transmissions employing interrupter switches which open and close by operative connection with some part movable with the shiftable drive control element. Thus, if such element fails to fully release then the ignition stays in its interrupted condition thereby rendering the engine inoperative as well as in failure of the transmission to function normally.

It is an object of my invention to overcome the aforesaid difficulties and failures by insuring disengagement of the movable drive control element under all desired conditions. This not only insures proper functioning of the ignition system and transmission mechanism but also provides for wider latitude in the allowable tolerances and clearances in the manufacture of the mechanism and controls therefor, and renders the device less sensitive to changes in temperature and resulting lubricant viscosity variation.

A further object of my invention is to provide improved and simplified means for controlling the torque-relieving or torque reversing means.

Another object is to provide an improved torque-relieving control which will automatically operate one or more times, according to the functioning of the movable drive control element, thereby insuring the desired movement of this element and preventing undue prolongation in the operation of the torque relief means.

An additional object is to provide a torque-relieving or torque reversing control which will operate automatically for a period of time variably proportional to and in response to movement of the movable control element or some member moving as a function of this control element.

Further objects and advantages of my invention reside in the novel combination and arrangement of parts more particularly hereinafter described and claimed, reference being had to the accompanying drawings in which:

Fig. 1 is a side elevational view showing the motor vehicle engine and power transmission.

Fig. 2 is a longitudinal sectional elevational view through the main clutching mechanism.

Fig. 3 is a similar view through the change speed transmission.

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship for the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a sectional elevational view taken approximately as indicated by line 10—10 in Fig. 3 but showing only the upper portion of the transmission mechanism and particularly the lever operating mechanism for the automatic clutching sleeve in its engaged position.

Fig. 11 is a diagrammatic view of the control mechanism for the automatic clutching sleeve, the latter being shown in its released position.

Fig. 12 is a similar view of the Fig. 11 mechanism corresponding to engaged position of the automatic clutching sleeve.

Fig. 13 is a detail enlarged view of my torque-relieving control as seen in Figs. 11 and 12.

While my control may be employed in conjunction with various types and arrangements of motor vehicle transmissions, especially where a pair of relatively movable positively engageable drive control elements are employed, in order to illustrate one driving system I have shown my invention in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 50ª to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A unitary blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the over- running clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

The transmission is provided with suitable prime mover means for controlling shift of sleeve F along with several control means. Referring particularly to Figs. 11 and 12, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an adjustable abutment 69 for adjusting the lost-motion at gap 70 (Fig. 12) as will presently be apparent.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

Arranged for engaging the abutment 69 during its arcuate movement about the axis of shaft 66, is a thrust-imparting leader member in the form of a reciprocatory rod 73 having an enlarged central portion 74 slidably supported in the bore 75 of motor G, rod 73 having a reduced rear end portion 76.

Motor G comprises a cylinder 77 which contains a piston 78, herein illustrated as the diaphragm type. This piston has its outer portion secured to cylinder 77 and its central portion fixed to the rod 73, the piston and rod being urged forwardly in a direction to release sleeve F by a spring 79 which is much stronger than spring 58. A suitable type of releasable holding means is provided for rod 73 so as to releasably hold this rod and piston 78 rearwardly retracted to their Fig. 12 positions against the action of spring 79 until it is desired to urge disengagement of sleeve F. This releasable holding means is illustrated in the form of a latch 80 which, under the action of a rat-trap spring 81, catches on the rearward shoulder of a detent 82 in rod portion 74 as in Fig. 12. At this time leader rod 73 moves rearwardly further than follower lever 67 by the amount of the aforesaid gap 70 such that on releasing latch 80 the rod 73 may move forwardly the amount of this gap without requiring sleeve F to move from its engaged position toward its disengaged position.

In carrying out my invention I provide means which functions to relieve the thrust-application between the teeth of sleeve F and the teeth 49 thereby facilitating movement of the drive-control sleeve element F from its Fig. 12 position of engaging relationship into its Fig. 11 position of disengaging relationship with respect to teeth 49. This relief means is arranged to function automatically proportional to disengaging movement of sleeve F and to forward travel of rod 73 from a first position as in Fig. 12 to a second position of taking up gap 70 and to a third position as in Fig. 11 where it is in the forwardmost limit of its travel corresponding to full disengaging travel of sleeve F. Thus this relief means will be operated one or more times depending on the manner in which sleeve F moves and the time of operation of the relief means will vary accordingly.

In the present instance the relief means is in the form of a system of grounding the primary terminal of the usual distributer of the engine ignition system whereby the engine ignition may be momentarily rendered inoperative thereby unloading the torque at sleeve F for one or more successive cycles sufficient to insure its release by spring 79. This ignition interrupting system is under control of a delayed action device or spring pressed inertia means and is illustrated in Figs. 11 to 13 as an inertia controlled switch J.

The switch J is disposed for operation within a rear cylindrical housing 83 carried by motor G in axial alignment with rod 73. Fixed within the housing 83 by a terminal fastener 84 and electrically insulated therefrom at 85, 86 is a forwardly open conductor cylinder 87. Mounted on the rear end of rod 76 and insulated therefrom at 88 is an outwardly spring conductor assembly 89 in constant sliding engagement with cylinder 87 so as to form one terminal at its conductor abutment 90 of the switch J. The other terminal comprises a conducting inertia member 91 slidably mounted on rod portion 76 and urged forwardly to engage an abutment 92 on rod portion 76 by a relatively small force compression spring 93 which seats on the insulation 88. The mass of member 91 bears the desired relationship to the force of spring 93, acceleration of rod 73 by spring 79 and any appreciable friction or other factor resisting movement of this member 91 along rod portion 76 between the limits of its travel from Fig. 12 to Fig. 11, such that it will accomplish the objects of the invention.

In Figs. 11 and 12 the ignition system includes distributer 94 having a primary terminal 95 from which a grounding conductor 96 extends for grounding the ignition system under control of switch J. The ignition grounding circuit therefor extends from conductor 96 to terminal 84 and through conductors 87, 89 and 90 to the inertia member 91 and thence by rod 76 to the body of the motor G which, by connection to the transmission affords a ground herein illustrated at 97. If desired the rod 76 may be grounded independently of the motor G.

When the latch 80 is released with the parts positioned as in Fig. 12, sleeve F being clutched, spring 79 operates to rapidly close the gap 70 at the lost-motion between rod 73 and lever 67 thereby establishing thrust-transmitting relationship between spring 79 and follower lever 67 for acting through lever 64 and yoke 60 to urge sleeve F rearwardly into its Fig. 4 position of disengagement with respect to the pinion teeth 49.

In order to illustrate the principles of my invention let it be assumed that latch 80 is released as aforesaid during the kick-down operation, as will presently be more apparent, such that the engine is operating under open throttle conditions whereby the engine torque is acting to cause pinion teeth 49 to transmit its drive at the sides of the short teeth 51 of sleeve F.

Under the foregoing circumstances, just prior to release of latch 80, spring 93 holds member 91 against abutment 92 and the rear end of member 91 is spaced from conductor 90 by an amount less than the gap 70 so that switch J is open. When latch 80 is released, spring 79 rapidly accelerates rod 73 forwardly and the inertia of member 91 is such that it lags the movement of the rod thereby bringing conductor 90 into contact with member 91 so as to close switch J and establish the ignition grounding circuit. When this occurs, the engine tends to slow down sufficiently to unload the thrust-application at sleeve F and rod 73 ordinarily completes its stroke to the Fig. 11 position of releasing sleeve F. Thereupon rod 73 stops and spring 93 acts to move member 91 forwardly to open the switch J which has been closed for a time period equal to that taken up by movement of rod 73 from its Fig. 13 position of closing switch J to its Fig. 12 position of opening switch J. The foregoing cycle of momentary interruption will occur provided that the sleeve F will slide freely, and provided that the various linkage parts do not tend to bind as may happen in very cold weather, and provided that the relationship of the inertia of member 91 and the force of spring 93 is such as to allow this cycle to occur. If the rod 73 is not sufficiently accelerated during the latter part of its forward stroke so as to allow spring 93 to open switch J during this stroke portion, then the ignition is restored and the engine tends to speed up. This characteristic is advantageous and is utilized to provide a number of cycles of momentary interruption of the ignition for progressively disengaging the sleeve in stages of movement, especially when the parts are sluggish in action or tend to bind. As an example let it be assumed that for some reason the sleeve F does not immediately release when rod 73 thrusts against lever 67, the switch J being closed as before, so that the sleeve tends to stick part way released. When this occurs the rod 73 will slow up or stop to allow switch J to automatically open by spring 93. Now as it takes only a fraction of a second for the drive load at the teeth of sleeve F to change to a coast load after switch J closes, by the time switch J opens, under said circumstances, the engine tends to speed up and reverse the tooth load from coast to drive or else to only relieve the coast load if the sleeve disengages before torque reversal can take place. This in turn allows rod 73 to again move sleeve F rearwardly and to close switch J and if rod 73 should again slow up or stop under the relieved drive load or the then coast load, then switch J opens again and the cycle of torque relief or torque reversal is repeated for any number of times automatically, the time of ignition interruption being of course responsive to and determined by movement of the rod 73 and sleeve F. If sleeve F should for any reason so jam that only gap 70 is taken up when latch 80 is released, then the ignition interruption is not unduly prolonged as spring 93 opens switch J and the car can be driven in second or fourth although this is, of course, an unusual condition. Ordinarily even with the occurrence of several cycles of momentary ignition interruption the disengagement of sleeve F occurs so rapidly as to be unnoticed on the part of the driver.

In the event that latch 80 is raised to start rod 73 forwardly at a time when sleeve F is driving teeth 49, as in bringing the car to rest, then the switch J may likewise function to provide one or a plurality of torque relief and restoring cycles just as previously set forth in connection with kick-down except, of course, that unless this occurs below or approximately at the idling speed of the engine there will not result any tendency to change the direction of imposed torque at teeth 49. Such arrangement may be provided although it is not altogether necessary as, in bringing the car to rest, the spring 79 is ordinarily of such strength as to cause release of the sleeve F as the coast torque load becomes relatively small.

The vacuum supply to the working chamber 98 is under control of the aforesaid solenoid H which comprises an armature plunger 99 having valving parts 100, 101. In Fig. 11 the solenoid H is energized thereby raising plunger 99 against spring 102 to seat valve 101 and shut off the vacuum supply to chamber 98 and at the same time unseat valve 100 so as to vent this chamber through passage 103, chamber 104 and vent passage 105. When the solenoid is de-energized then spring 102 lowers plunger 99 thereby seating valve 100 to shut off vent 105 and open valve 101 as in Fig. 12 thereby opening chamber 98 to the engine intake manifold K through passage 103, chamber 104, chamber 105 and pipe 107.

A certain lost motion is provided between plunger 99 and the inwardly bent finger 108 of latch 80 so that when the plunger moves downwardly the latch may subsequently catch at detent 82 when vacuum operates piston 78, the parts then remaining in the Fig. 12 position independently of vacuum in chamber 98 until solenoid H is energized to release the latch and vent chamber 98.

It is deemed preferable to provide a speed control on the energization of solenoid H so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 109 is a governor L of any suitable type, this governor operating a sleeve 110 outwardly along its drive shaft 111 as the car speed reaches a predetermined point, the break-away being under control of a detent 112 if desired.

The sleeve 110 has a shoulder 113 engaged by the swinging switch piece 114 of the governor switch M. When the car is stationary the detent 112 is engaged and switch M is closed. As the car accelerates the governor eventually reaches its critical speed and detent 112 releases thereby causing switch M to open. As the car slows down, the governor spring 115 restores the parts to the Fig. 11 position and by proportioning the various parts it is obvious that switch M may be made to function at desired speeds proportionate to car travel. As an example of one arrangement of governor operation and gearing arrangement, the governor may be made to open switch M during car acceleration in first and third respectively at approximately 7 and 15 M. P. H. (miles per hour), the switch M closing on stopping the car in direct and second at approximately 7 and 3 M. P. H. respectively.

The driver operated ignition switch is designated at N and comprises a conductor 116 which, in the Fig. 11 position showing the switch "on" or closed, electrically connects contacts 117 and 118. Contact 117 extends by conductor 119 to ammeter 120 and thence by conductor 121 to the usual storage battery 122 and thence to ground 123. Contact 118 has a conductor 124 extending by conductor 125 branching therefrom to the engine ignition system herein shown in part as comprising coil 126 and distributor 94 having the aforesaid primary terminal 95.

A second conductor 127 branches from the conductor 124 to the solenoid H and thence by conductor 128 to two conductors 129 and 130, the former extending to governor switch M and thence to ground 131. Conductor 130 extends to kick-down switch O and thence to ground 132. The switch O is normally open and is closed preferably by a full depression of accelerator pedal 50' acting through link 133 and a bell-crank lever 134 pivotally mounted at 135. Lever 134 actuates a link 136 which extends forwardly to adjust the engine throttle valve lever 137. When pedal 50' is thus depressed, the lever 137 is positioned to fully open the throttle valve 138 and as the throttle valve is adjusted in its wide-open range the lever 134 closes switch O to effect a step-down in the transmission from fourth to third or from second to first by energizing the solenoid H.

The governor solenoid circuit is as follows: ground 123 to battery 122 thence by conductor 121 to ammeter 120 and by conductor 119 to ignition switch N. From switch N this circuit extends through conductors 124 and 127 to solenoid H and thence by conductors 128 and 129 to switch M and ground 131.

The kickdown solenoid circuit is the same as the governor solenoid circuit to conductor 128 whence this circuit extends by conductor 130 to kickdown switch O and ground 132.

The engine ignition circuit is the same as the governor solenoid circuit up to the conductor 124 whence this circuit extends by conductor 125 to coil 126 and distributor 94.

The ignition grounding circuit under control of switch J extends from the distributor 94 through conductor 96 to interrupter switch J. From switch J this grounding circuit extends to a suitable ground. This ground may, if desired, be provided either at 132 through conductor 130 and kickdown switch O or else at 131 through conductor 129 and governor switch M by electrically connecting rod 76 or motor G with conductor 128 in which case motor G should be insulated at its mounting and where it connects with other parts.

It is ordinarily deemed sufficient to ground rod 76 as at 97. When rod 73 moves rearwardly under vacuum it will be apparent that switch J does not close unless at the end of its stroke member 91 should be thrown against conductor 90 in which case spring 93 will immediately restore the ignition. If the interrupter circuit is grounded at 128 as aforesaid then switch J will not interrupt the ignition on the rearward movement of rod 73 as switches M and O are then open.

In the operation of the mechanism, the car at standstill and with the ignition switch N closed and the engine idling will cause the solenoid H to be energized as in Fig. 11 because governor switch M is closed thereby establishing the governor solenoid circuit. Cylinder 77 is vented and sleeve F disengaged. The driver shifts sleeve 42 to either the high or low range and accelerates the car ordinarily above the critical speed of governor L thereby causing switch M to open to break the governor solenoid circuit. As vacuum builds up in the engine intake manifold K, plunger 99 now being lowered by spring 102 because switch M is open, piston 78 will be operated by vacuum thereby moving rod 73 to its Fig. 12 latched position. As soon as the driver allows the engine to coast, sleeve F will engage teeth 49 synchronously, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor L directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kickdown, switch O closes thereby energizing the kickdown solenoid circuit and causing solenoid H to raise plunger 99 and release latch 80 thereby venting chamber 78. At this time the sleeve F is under driving torque from the engine operating under wide open throttle. However, when latch 80 is released, spring 79 operates rod 73 forwardly under accommodation of gap 70 to start the single or plurality of cycles of momentary ignition interruption by switch J thus insuring release of sleeve F whereupon the ignition is finally restored by spring 93 and the engine quickly speeds up to engage overrunning clutch E for establishing the third or first driving ratio depending on the setting of sleeve 42 prior to the kickdown operation.

I claim:

1. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operating to control movement of said movable element; and inertia means operably associated with said control means for effecting operation of said relief means.

2. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operating to control movement of said movable element; and inertia controlled means operably associated with said control means for effecting operation of said relief means.

3. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operating to control movement of said movable element; and spring-pressed inertia means operably associated with said control means for effecting operation of said relief means.

4. In a drive for a motor vehicle having an engine; transmission mechanism operable to provide a drive between the engine and the vehicle; said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operating to control movement of said movable element; and time lag means comprising an inertia element operably associated with said control means for effecting operation of said relief means for variable periods of time proportional to and in response to movements of said movable element toward its said disengaging relationship.

5. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and inertia means operably associated with said leader member for controlling operation of said relief means.

6. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and an inertia element having a lost-motion connection with said leader member for controlling operation of said relief means.

7. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatvely engaged being subject to thrust-aplication therebetween during said drive so as to resist relative disengagement thereof to release said drive until said thrust-application is relieved; means operable to cause relief of said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and an inertia element operably associated with said leader member for effecting operation of said relief means for variable periods of time proportional to and in response to movements of said leader member from its said first position toward its said third position.

8. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operating to control movement of said movable element; and inertia controlled means operably associated with said control means for effecting interruption of said ignition system.

9. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; means operating to control movement of said movable element; means for interrupting said ignition system; and spring-pressed inertia means operably associated with said control means for controlling said interrupting means such that said ignition system is interrupted for variable periods of time proportional to and in response to movements of said movable element toward its said disengaging relationship.

10. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; and inertia controlled means operably associated with said leader member for effecting interruption of said ignition system for variable periods of time proportional to and in response to movements of said leader member from its said first position toward its said third position.

11. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; an ignition system for said engine adapted to be interrupted to relieve said thrust-application; a follower member operably connected to said movable element and adapted for movement from a first position to a second position thereof for causing movement of said movable element from its said engaging relationship into its said disengaging relationship; a leader member movable relative to said follower member from a first position of said leader member to a second position of said leader member providing a thrust-transmitting relationship with respect to said follower member when the latter is in its said first position, said leader member being adapted for movement from its said second position to a third position thereof for causing movement of said follower member from its said first position to its said second position; means operating to control movement of said leader member; means for interrupting said ignition system; and time lag means comprising an inertia element having a lost-motion connection with said leader member for controlling said interrupting means such that said ignition system is interrupted for variable periods of time proportional to and in response to movements of said leader member from its said first position toward its said third position.

12. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operable to control movement of said movable element, comprising, an operating member adapted for movement relative to said movable element into a position urging movement of said movable element from its said position of engaging relationship toward its said position of disengaging relationship; and switch means for controlling operation of said relief means, comprising, a first switch element carried by said operating member, a second switch element slidably mounted on said operating member for movement relative to the first switch element between predetermined limits of travel, the first switch element contacting with the second switch element when the latter is in one of its said limits of travel, and a spring biasing the second switch element toward the other of its said limits of travel, said switch elements and said spring being so arranged and the inertia of the second switch element being such that movement of said operating member relative to said movable element as aforesaid causes the second switch element to lag behind said operating member thereby to establish said contacting relationship between said switch elements.

13. In a drive for a motor vehicle having an engine; a variable speed ratio transmission comprising means operable to effect change in the speed ratio drive between the engine and vehicle; means operable to cause momentary torque reversal in said transmission thereby to facilitate operation of said speed ratio change means; said speed ratio change means comprising an operating member; and inertia switch means operably associated with said operating member for controlling operation of said torque reversal means as an incident to movement of said operating member.

14. In a drive for a motor vehicle having an engine; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; means operable to control movement of said movable element, comprising, an operating member adapted for movement relative to said movable element into a position urging movement of said movable element from its said position of engaging relationship toward its said position of disengaging relationship; and inertia switch means operably associated with said operating member for controlling operation of said relief means as an incident to movement of said operating member, said switch means comprising an inertia switch element slidably associated with said operating member so as to lag behind this member during movement of this member, and a spring acting to yieldingly oppose said lag.

15. In a drive for a motor vehicle having a throttle controlled intake; means operable under control of the vehicle driver for effecting opening and closing movements of said throttle; transmission mechanism operable to provide a drive between the engine and the vehicle, said mechanism including positively engageable drive-control elements one of which is movable into engaging relationship with the other to accommodate said drive and into disengaging relationship with respect to said other element to release said drive, said elements when relatively engaged being subject to thrust-application therebetween during said drive so as to resist relative disengagement thereof to release said drive until said thrust-application is relieved; means operable to cause relief of said thrust-application; an operating member adapted for movement relative to said movable element from a first position of said operating member into a position thereof thereby to establish a thrust-transmitting connection between said operating member and said movable element for urging movement of the latter toward its said disengaging relationship; means releasably holding said operating member in its said first position; means for effecting release of said holding means in response to throttle opening movement of said driver controlled means; means operating upon release of said holding means for thrusting said operating member from its said first position to its said second position; and inertia controlled means operably associated with said operating member for effecting operation of said relief means automatically in response to movement of said operating member from its said first position to its said second position.

IAN C. McKECHNIE.